(12) United States Patent  
Lyons et al.

(10) Patent No.: US 7,754,320 B2
(45) Date of Patent: Jul. 13, 2010

(54) COMPOSITE FIBER CEMENT ARTICLE WITH RADIATION CURABLE COMPONENT

(75) Inventors: David Lyons, Point Clare (AU); Donald James Merkley, Alta Loma, CA (US); Theresa Sukkar, Blacktown (AU)

(73) Assignee: James Hardie Technology Limited, Dublin (IE)

( * ) Notice: Subject to any disclaimer, the term of this patent is extended or adjusted under 35 U.S.C. 154(b) by 1357 days.

(21) Appl. No.: 11/035,386

(22) Filed: Jan. 12, 2005

(65) Prior Publication Data

US 2005/0208285 A1 Sep. 22, 2005

Related U.S. Application Data

(60) Provisional application No. 60/536,172, filed on Jan. 12, 2004.

(51) Int. Cl.
  *D04H 1/00* (2006.01)
  *B32B 27/38* (2006.01)
  *B32B 3/26* (2006.01)
  *B32B 3/00* (2006.01)
(52) U.S. Cl. ............... 428/292.1; 428/172; 428/304.4; 428/318.6; 428/413
(58) Field of Classification Search ............... 428/292.1
  See application file for complete search history.

(56) References Cited

U.S. PATENT DOCUMENTS

| | | | |
|---|---|---|---|
| 2,024,689 A | 12/1935 | Walter et al. |
| 2,880,101 A | 3/1959 | Torsten Ulfstedt |
| 3,935,364 A | 1/1976 | Proksch et al. |
| 4,330,634 A | 5/1982 | Rodaway |
| 4,351,867 A | 9/1982 | Mulvey et al. |
| 4,498,913 A | 2/1985 | Tank et al. |
| 4,528,307 A | 7/1985 | Fuhr et al. |
| 4,590,884 A | 5/1986 | Kreeger et al. |

(Continued)

FOREIGN PATENT DOCUMENTS

AU 515151 3/1981

(Continued)

OTHER PUBLICATIONS

Jianquan et al "Research on Water Resistant Performance of Modified Polymer Cement Composite Reinforced with Fiber" Mar. 2003.

(Continued)

*Primary Examiner*—D. L Tarazano
*Assistant Examiner*—Camie S Thompson
(74) *Attorney, Agent, or Firm*—Gardere Wynne Sewell, LLP

(57) ABSTRACT

A composite building article is configured with one or more subsurface interfacial zones provided to improve the durability of the article. Each subsurface interfacial zone is made of a matrix of fiber cement and radiation curable material. The radiation curable material forms an interlocking network with the fiber cement to provide a interfacial zone against ingress of environmental agents that can degrade the article. The number, configuration and distribution of the subsurface interfacial zones can vary dependent on the desired characteristics of the final product. The subsurface interfacial zones also improves the adhesion between exterior coatings and the substrate as the interfacial zones can be integrally formed with the substrate as well as exterior coating layer.

17 Claims, 4 Drawing Sheets

U.S. PATENT DOCUMENTS

| | | | |
|---|---|---|---|
| 4,621,024 A | 11/1986 | Wright | |
| 4,652,433 A | 3/1987 | Ashworth et al. | |
| 4,723,505 A | 2/1988 | Wilson et al. | |
| 4,751,202 A | 6/1988 | Toussaint et al. | |
| 4,751,203 A | 6/1988 | Toussaint et al. | |
| 4,871,380 A | 10/1989 | Meyers | |
| 4,910,047 A | 3/1990 | Barnett et al. | |
| 4,981,666 A | 1/1991 | Yamada et al. | |
| 5,018,909 A | 5/1991 | Crum et al. | |
| 5,077,241 A | 12/1991 | Moh et al. | |
| 5,292,690 A | 3/1994 | Kawachi et al. | |
| 5,349,118 A | 9/1994 | Davidovits | |
| 5,447,798 A * | 9/1995 | Kamaishi et al. | 428/414 |
| 5,580,907 A | 12/1996 | Savin | |
| 5,658,656 A | 8/1997 | Whitney et al. | |
| 5,851,607 A | 12/1998 | Horinka et al. | |
| 5,871,824 A | 2/1999 | Bates | |
| 5,925,449 A | 7/1999 | Davidovits | |
| 6,096,388 A | 8/2000 | Bates | |
| 6,171,651 B1 | 1/2001 | Brown | |
| 6,432,212 B1 | 8/2002 | Hirose et al. | |
| 6,436,485 B1 | 8/2002 | Sedlmeyr | |
| 6,488,762 B1 | 12/2002 | Shi | |
| 6,531,189 B1 | 3/2003 | Blatter et al. | |
| 6,541,544 B1 | 4/2003 | Hart et al. | |
| 6,572,697 B2 | 6/2003 | Gleeson et al. | |
| 6,572,698 B1 | 6/2003 | Ko | |
| 6,582,819 B2 | 6/2003 | McDaniel et al. | |
| 6,689,451 B1 * | 2/2004 | Peng et al. | 428/294.7 |
| 6,706,794 B1 | 3/2004 | Tsuda et al. | |
| 6,832,652 B1 | 12/2004 | Dillenbeck et al. | |
| 7,300,546 B2 | 11/2007 | Jewell et al. | |
| 2002/0114888 A1 | 8/2002 | Magliocca | |
| 2003/0148039 A1 | 8/2003 | Blum et al. | |
| 2006/0024480 A1 | 2/2006 | Lyons et al. | |
| 2006/0288909 A1 | 12/2006 | Naji et al. | |
| 2008/0095692 A1 | 4/2008 | Pham | |
| 2009/0090276 A1 | 4/2009 | Feng et al. | |

FOREIGN PATENT DOCUMENTS

| | | |
|---|---|---|
| CA | 2405354 | 11/2001 |
| CL | 235301 | 7/2001 |
| CL | 234601 | 8/2002 |
| CL | 235201 | 11/2002 |
| CN | 1052519 A | 6/1991 |
| CN | 2435455 Y | 6/2001 |
| DE | 44 10 020 A1 | 9/1995 |
| DE | 20105063 U1 | 8/2001 |
| DE | 10106888 A1 | 9/2002 |
| EP | 0 104 540 A2 | 4/1984 |
| EP | 1144129 B1 | 10/2001 |
| EP | 1891984 A1 | 2/2008 |
| FR | 2671072 | 7/1992 |
| JP | 09067174 | 3/1997 |
| WO | WO 81/00422 A | 2/1981 |
| WO | WO 97/25389 | 7/1997 |
| WO | WO 98/45222 | 10/1998 |
| WO | WO 01/24988 A1 | 4/2001 |
| WO | WO 01/43931 A1 | 6/2001 |
| WO | WO 01/68547 A1 | 9/2001 |
| WO | WO 02/02481 A | 1/2002 |
| WO | WO 02/26897 A2 | 4/2002 |
| WO | WO 02/28795 A2 | 4/2002 |
| WO | WO 02/28796 A2 | 4/2002 |
| WO | WO 02/39039 A1 | 5/2002 |
| WO | WO 03/074193 A2 | 9/2003 |

OTHER PUBLICATIONS

International Search Report for PCT/US2005/000957, filed Dec. 1, 2005.

U.S. Appl. No. 60/536,172, filed Jan. 12, 2004, Lyons et al.

Sevcik V., XP002389199, "Mixture for Refractory Purposes," Database EPODOC, European Patent Office, the Hague, NL; abstract (Oct. 15, 1997).

Rozman et al., "Improvements of Fibreboard Properties through Fibre Activation with Silane," Intern. J. Polymeric Mater., vol. 32 (1996) pp. 247-257.

U.S. Appl. No. 10/873,723, filed Jun. 21, 2004 entitled "Durable Building Article and Method of Making Same"; (Abandoned May 18, 2005).

* cited by examiner

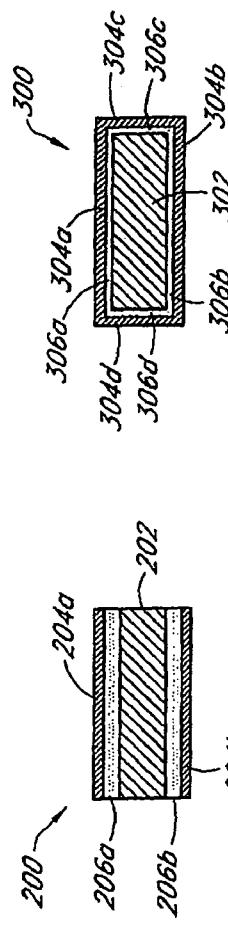
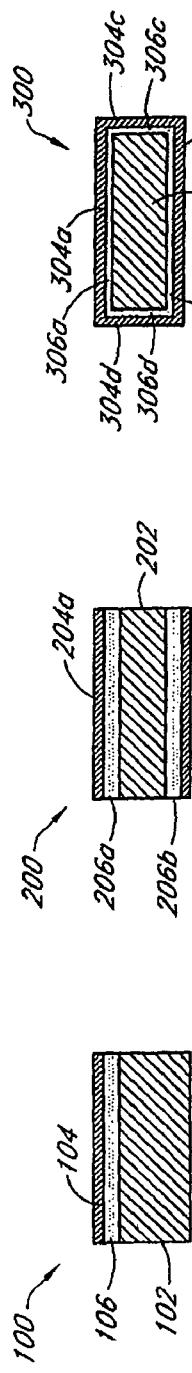
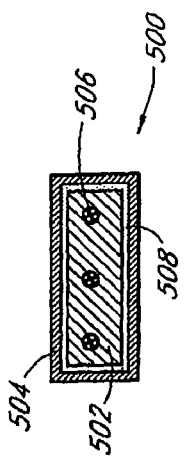
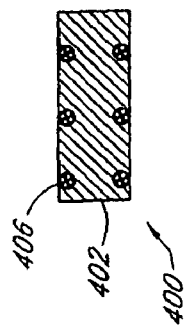
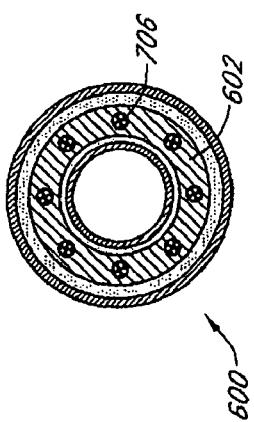
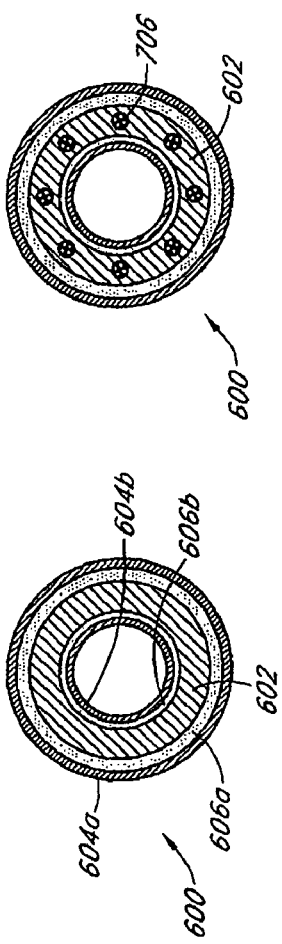

COMPOSITE FIBER CEMENT ARTICLE WITH RADIATION CURABLE COMPONENT

RELATED APPLICATIONS

This application claims the benefit of U.S. Provisional Patent Application No. 60/536,172, filed on Jan. 12, 2004, which is hereby incorporated by reference in its entirety.

BACKGROUND OF THE INVENTION

1. Field of the Invention

This invention generally relates to composite building articles, in particular to composite fiber cement building articles incorporating one or more radiation curable components, including formulations and methods of making the composite articles.

2. Description of the Related Art

Fiber reinforced cement (FRC) products are increasingly being used in a variety of building applications and climatically different regions. FRC products have gained favor for their inherent fire, water, pest and mold resistance, as well as their general affordability. However, continued cyclic exposure to wetting-drying cycles, freezing-thawing cycles, UV exposure and atmospheric carbon dioxide can cause physical and chemical changes in FRC products over time. FRC building materials can also be subject to physical damage during handling shipping and installation.

Coatings, and laminates have been developed to protect FRC products to reduce the detrimental effects of exposure and handling and simultaneously provide a decorative surface for FRC products. In cases where the fiber cement articles are treated by the application of a surface coating, the end product often still remains susceptible to both physical and chemical modes of degradation. Coatings and laminates are inherently surface treatments and are susceptible to loss of adhesion or delaminating from a substrate upon repeated exposure. While is it well known to use adhesion promoters or coatings or adhesives that are chemically reactive with the substrate to improve adhesion, this strategy is not always successful in maintaining adhesion over many years of outdoor exposure in extreme climates or severe conditions, such as wet environments experiencing many freeze/thaw cycles. What is needed is a means of maintaining a decorative surface on FRC materials in extreme conditions.

Similar to environmental damages, mishandling during installation can also negatively impact the service life of an FRC product. Mishandling may cause the applied surface coating or laminate to crack, tear or suffer abrasion damage or delamination. If the integrity of the surface coating or laminate is compromised, repeated exposure to extreme environments may lead to loss of adhesion and damage to the underlying FRC substrate. What is needed is a means of maintaining FRC product integrity in spite of surface damage to a coating or laminate.

In view of the foregoing, there is a need for an FRC composite with a decorative or functional surface, such that the appearance and integrity of the surface is maintained even in extreme environments, and which simultaneously provides a means of maintaining the integrity of the composite should its surface become damaged or compromised. There is also a need to substantially reduce the number of treatments required to allow the composite achieve a requisite level of performance in a given application. To this end, there is a particular need for an FRC product that is simultaneously highly wear resistant, water resistant, resistant to damage over a long exposure to freeze/thaw conditions and is capable of achieving these performance characteristics with substantially reduced of cost and materials.

It is thus an object of the present invention to provide a composite article and methods of making that article which will overcome or ameliorate one or more of the disadvantages of the prior art.

SUMMARY OF THE INVENTION

In one aspect, the preferred embodiments of the present invention provide a composite building article having a first zone which comprises predominantly fiber cement, a second zone which comprises predominantly a radiation curable material, and a subsurface interfacial zone interposed therebetween. The subsurface interfacial zone preferably comprises an interlocking matrix formed of the radiation curable material and the fiber cement, wherein the interfacial zone is configured to increase the durability of the building article. Preferably the interfacial zone is present to a predetermined extent through a cross section of the composite article. The radiation curable material can be selected from the group consisting of epoxies, urethanes, polyesters, acrylates, methacrylates, thiol-acrylates, unsaturated polyesters, polyester epoxies, urethane acrylics, styrene and functionalized styrenes or mixtures thereof. In one embodiment, the thickness of the subsurface interfacial zone can be controlled by modifying a characteristic selected from the group consisting of the porosity of the first zone, viscosity of the carrier solution for the radiation curable material, the viscosity of the radiation curable material itself, the wetting behavior of the radiation curable material and the reactivity of the radiation curable material with the material of the first zone. In one embodiment, the first zone comprises a fiber cement substrate having a porosity of between about 2%-80% by volume, more preferably between about 20%-40%. In another embodiment, the entire cross section of the composite building article comprises the subsurface interfacial zone. In another embodiment, the subsurface interfacial zone is integrally formed with the first and second zones, and has a thickness of about 1 μm to 1,000 μm. Preferably, the radiation curable material in the subsurface interfacial zone contains substantially no catalyst and is curable primarily by radiation. The composite building material is preferably selected from the group consisting of cladding panels, sheets, boards, planks, trim, columns and pipes.

In another aspect, the preferred embodiments of the present invention provide a building article wherein at least a portion of the matrix of the building article comprises a network formed of fiber cement and a radiation curable material. Preferably, the network is configured to increase the durability of the building article. In one embodiment, the fiber cement and radiation curable material are interspersed throughout the matrix of the building material. Preferably, the radiation curable material is present in fiber cement material pores with a mean pore size greater than 0.01 microns. In another embodiment, the building article further comprises reinforcement fibers wherein at least a portion of the fibers are treated with a radiation curable material. In yet another embodiment, the building article further comprises an exterior coating formed of predominantly the radiation curable material. Preferably, the exterior coating is integrally formed with the network so as to increase the adhesion between the exterior coating and the matrix of the building article. In an alternate embodiment, the building article comprises an exterior coating which is applied to at least one surface.

In yet another aspect, the preferred embodiments of the present invention provide a method of forming a building product. The method comprises applying a radiation curable material to a fiber cement substrate, wherein the radiation curable material extends into the substrate in a controlled manner and forms a region comprising a mixture of the radiation curable material and fiber cement. The method further includes applying radiation to cure the radiation curable material in the substrate so as to form a three dimensional network of radiation cured material and fiber cement. Preferably, electron beam radiation is applied to cure the radiation curable material. Preferably, the radiation curable material directly contacts the fiber cement substrate. In another embodiment, the radiation curable material is cured in a multistage process.

In yet another aspect, the preferred embodiments of the present invention provide a method of forming a building product. The method includes the steps of combining a radiation curable material with ingredients for forming a fiber cement composite material, forming a green sheet wherein the radiation curable material is distributed throughout at least a portion of the green sheet, and curing the green sheet to form a building product containing a network of fiber cement and radiation curable material. In one embodiment, the method further comprises bonding the green sheet to an uncured fiber cement substrate prior to curing the green sheet. In another embodiment, the method further comprises applying a coating to at least one surface the building product.

BRIEF DESCRIPTION OF THE DRAWINGS

FIG. 1 is a cross sectional view of a composite building article of one preferred embodiment, showing a subsurface interfacial zone formed in the article;

FIG. 2 is a cross sectional view of a composite building article of another embodiment, showing two subsurface interfacial zones formed in the article;

FIG. 3 is a cross sectional view of a composite building article of another embodiment having subsurface interfacial zones formed adjacent to the exterior faces of the building article;

FIG. 4 is a cross sectional view of a composite building article of another embodiment having discrete subsurface interfacial zones formed in the substrate of the article;

FIG. 5 is a cross sectional view of a composite building article of another embodiment having two different types of subsurface interfacial zones formed in the substrate of the article;

FIG. 6 is a cross sectional view of a hollow composite building article incorporating a subsurface interfacial zone adjacent to the outer surfaces of the building article;

FIG. 7 is a cross sectional view of a hollow composite building article incorporating two different types of subsurface interfacial zone in the article;

DETAILED DESCRIPTION OF THE PREFERRED EMBODIMENTS

Figure 8:
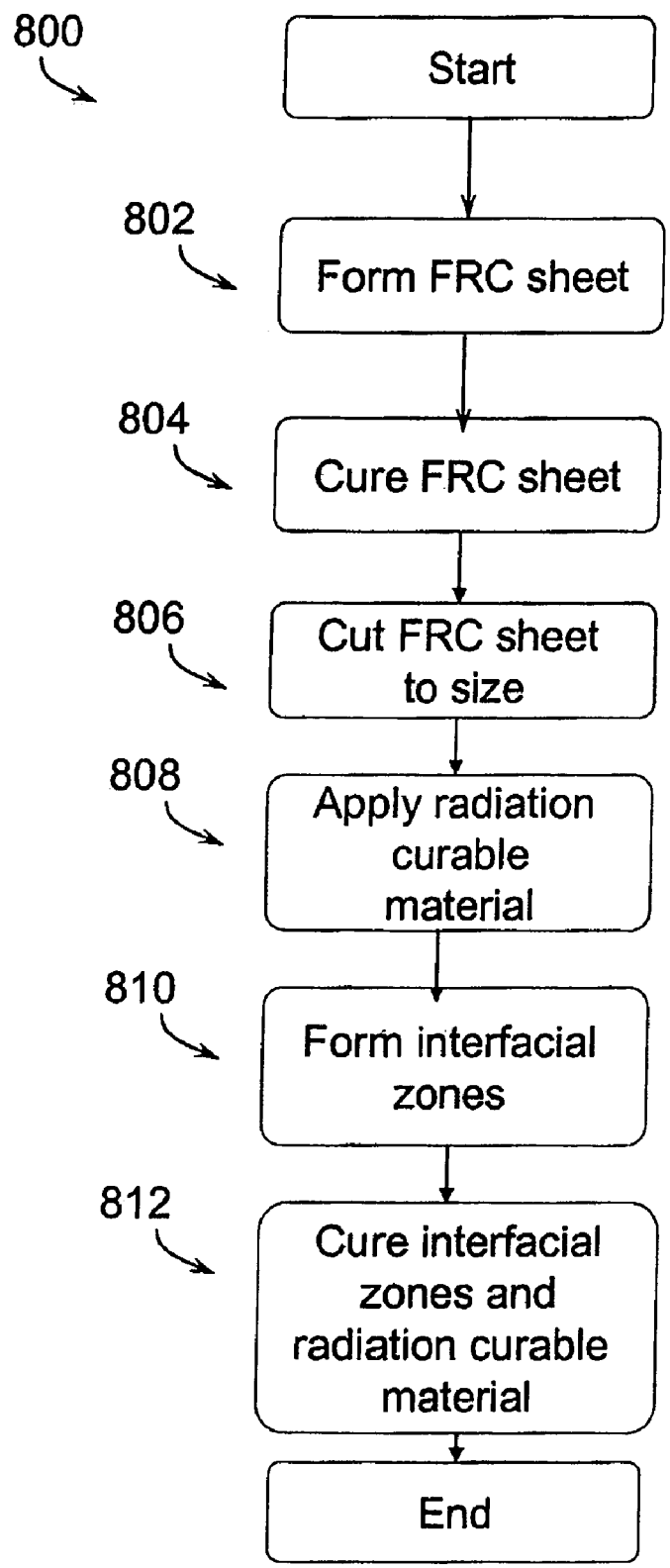
FIG. 8 illustrates a process for forming a composite building article of a preferred embodiment of the present invention.

The preferred embodiments of the present invention provide a composite building article having one or more subsurface interfacial zones which is formed of an interlocking network of fiber cement and radiation curable material. As will be described in greater detail below, the interfacial zones are preferably integrally formed with the substrate and an exterior surface of the building article to provide an effective interfacial to ingress of environmental agents and improve the durability, weather resistance, strength, toughness of the building article.

References will now be made to the drawings wherein like numerals refer to like parts throughout. FIG. 1 schematically illustrates a cross sectional view of a composite building article 100 of one preferred embodiment of the present invention. As shown in FIG. 1, the building article 100 generally includes a substrate 102 which is formed of predominantly fiber cement, an exterior layer 104 which is formed of predominantly a radiation curable material, and a subsurface interfacial zone 106 which is formed of a network of fiber cement and radiation curable material. The term "predominantly" as used herein shall mean comprising more than 50% by weight.

The substrate 102 of the composite building article 100 in FIG. 1 is preferably porous and/or hydrophilic. The substrate can be made of a variety of different materials such as a gypsum composite, cement composite, geopolymer composite or other composite comprising an inorganic binder. Preferably, the substrate is a low density fiber cement board having a porosity of about 40%-80% by volume, a medium density fiber cement board having a porosity of about 20-40% by volume, or a high density/compressed fiber cement board having a porosity of about 2%-20% by volume. As will be described in greater detail below, the porosity of the substrate can also be modified by mechanical or chemical treatment to control the formation of the interfacial zone. The porosity of the substrate can be broken down into five major groupings as follows.

i) Air Pores (about 100-10 microns). These relate to macro pores caused by poor packing, fiber clumping, dewatering etc. Sometimes they are simply referred to as cracks or interlaminar pores.

ii) Fiber Pores (10-1 microns). These relate to pores inherent in the lignocellulosic fibers specifically due to their tubular structure and skew-like shape.

iii) Meso Pores (1-0.1 microns).

iv) Capillary Pores (0.1-0.01 microns). These relate to pores originating upon depletion of free water in the matrix.

v) Gel Pores (0.01-0.001 microns). These pores relate to the cement or 10 binder micropores and are quite small in size and difficult to modify.

Without wishing to be bound by any particular theory, the Applicants have hypothesized that the properties of substrate 102, in particular durability in extreme climactic conditions, may be linked to modifying or treating the pores in the resultant building article, particularly to those pores with a mean pore size between 0.01 microns and 100 microns and most particularly those pores with a mean pore size between 1 micron and 100 microns.

The substrate 102 can be sanded, machined, extruded, molded or otherwise formed into any desired shape. The substrate 102 may be fully cured, partially cured or in the uncured "green" state. A variety of different fiber cement compositions and methods of making fiber cement substrates can be used for these applications, such as those described in Australian Patent AU515151, PCT Application WO 0168547, and PCT Application WO9845222, which are hereby incorporated by reference in their entirety.

The subsurface interfacial zone 106 illustrated in FIG. 1 is preferably integrally formed with the substrate 102 and comprises an intimate blend of fiber cement and one or more radiation curable components. The radiation curable component interpenetrates the voids and interstices in the fiber cement and mechanically interlocks with the fiber cement to form a subsurface three-dimensional network, which substantially resists the ingress of environmental agents such as water. Preferably the radiation curable component is present in pores with mean pore diameters greater than 0.01 microns, more preferably the radiation curable component is present in pores with a mean pore diameters between 0.1 and 100 microns. Most preferably the radiation curable component is present in pores with a mean pore diameters between 1 and 100 microns. In some embodiments, the radiation curable component is also chemically bonded to the pore walls of the substrate 102 and/or the reinforcement fibers. Because the interfacial zone 106 is integrally formed with the substrate 102, it is much less susceptible to degradation and damage as compared to conventional protective coatings or laminates formed on the exterior surfaces of building articles. The number, shape, distribution, and thickness of the interfacial zone can be selected based on the intended final use of the composite article. In one embodiment, the interfacial zone 106 comprises substantially the entire thickness of the composite article. In another embodiment, the interfacial zone 106 is about 1 to 1,000 µm thick, preferably about 5 to 500 µm thick, more preferably about 10 to 200 µm thick.

The radiation curable component in the interfacial zone 106 preferably contains substantially no catalyst and is cured primarily by radiation such as UV, IR, NIR microwave, or gamma radiation, more preferably by electron beam (EB) radiation. The radiation curable component can include but is not limited to polymeric materials such as epoxies, urethanes, polyesters, acrylates, methacrylates, and compounds having multiple functional types such as polyester epoxies and urethane acrylics. In one embodiment, the radiation curable component may be monomers, oligomers, or polymers. The oligomers can be prepared from a range of monomers with functionality including but not limited to isocyanate, hydroxyl, polyether, epoxy, carboxylic acid, free radical systems such as thiolene systems (based on the reaction of multifunctional thiols and unsaturated polyenes, such as vinyl ethers; vinyl sulfides; allylic ethers; and bicyclic enes); amine-ene systems (based on the reaction of multifunctional amines and unsaturated polyenes); acetylenic systems; systems wherein the reactive portion of the component is internal rather than terminal; other vinylic (e.g., styrenic) systems; acrylamide systems; allylic systems; itaconate systems and crotonate systems; and cationic cure systems such as onium salt-induced vinyl ether systems and epoxy-terminated systems which react by ring-opening; and any others based on compounds possessing reactive termini. In fact, virtually any functional groups which cure by irradiation, thermal or other means but do not adversely affect the desirable properties (i.e., the oxidative, thermal and hydrolytic stability and the moisture resistance) of the cured composition are envisioned to be suitable for radiation curable component 106. Radiation curable components comprising thiolene are especially preferred where the radiation curable component is to be cured in air.

Radiation curable component 106 may also comprise monomers including but are not limited to acrylate or methacrylate functionalized alcohols, diols and polyols, acrylate or methacrylate functional ethoxylated and/or propoxylated alcohol, diols and polyols, and acrylate or methacrylate functional ethylene and propylene glycols and ethylene and propylene polyglycols, and other ethylenically unsaturated monomers such as styrene, and functionalized styrenes. Other monomers effective in preparing such composites include but are not limited to derivatives of unsaturated carboxylic acids and diacids such as maleate and fumarate esters, and vinylic functional materials such as vinyl ethers, and vinyl pyrrolidones. Blends or mixtures of the radiation curable components described herein may also be used. Additives such as pigments, mineral extenders, surfactants, anti-wetting agents, dyes, plasticizers, stabilizers, shockproofing agents, insulating agents, flame retarding agents can also be added to the radiation curable component to improve the physical-chemical properties of the finished product.

The radiation curable component is preferably 100% solids and has low VOC content. Alternately the radiation curable component may be dissolved, suspended or emulsified in a fluid, including but not limited to an organic solvent, water a supercritical fluid such as $CO_2$. The radiation curable component preferably has a solids content higher than about 50%, more preferably higher than about 70%, and even more preferably about 80%-100% solids. In some implementations, the radiation curable component may also contain viscosity modifying agents, surfactants, or mineral fillers. 100% solids composition have been found advantageous in forming the interfacial zone. The viscosity of the high solids composition is preferably engineered to achieve a predetermined distribution within the fiber cement matrix and voids. In one embodiment, monomers may be used modify the viscosity of the high solids radiation curable component. Preferably the high solids ration curable component has a monomer content of between 1 and 60% by weight, more preferably between 2 and 40% and more preferably less than 40% and greater than 5%, 10%, 15%, 20%, 25%, or 30%. If emulsion based systems are used, it is preferable if the emulsion particle size is engineered to facilitate void filling.

The exterior layer 104 of the building article 100 in FIG. 1 comprises a layer of protective coating such as radiation curable coating, or thermally curable coatings, primers, sealers, or the like. In some embodiments, the exterior layer 104 comprises the same radiation curable material as that incorporated in the interfacial zone 106. As will be described in greater detail below, the exterior layer 104 can be integrally formed with the interfacial zone 106 to enhance the adhesion between the exterior layer 104 and the substrate 102. Advantageously, the continuous exterior layer 104 in combination with the subsurface three-dimensional network of radiation curable material and fiber cement 106 improves the aesthetics of the product and improves the long term durability of the product in extreme conditions. Additionally, the continuous exterior layer may also serve as a means of transmitting energy or an initiating species to the lower subsurface curable material which otherwise would be difficult to reach by the primary radiation source.

It will be appreciated that the number, location, and configuration of the subsurface interfacial zones within the building article can vary based on the design and intended purpose. A single or multiple interfacial zones can be incorporated within the building article with each interfacial zone containing one or more radiation curable components. FIGS. 2-7 schematically illustrate various embodiments of building articles which have one or more subsurface interfacial zones distributed within the article in various manners.

FIG. 2 schematically illustrates a cross sectional view of a composite building article 200 of one such embodiment. The building article 200 has a fiber cement substrate 202, two opposing exterior layers 204a, 204b, and two integrally formed subsurface interfacial zones 206a, 206b each interposed between the fiber cement substrate 202 and an exterior layer 204a, 204b. The exterior layers 204a, b are preferably coated with a protective coating such as a radiation curable sealer.

FIG. 3 shows a cross section view of a composite building article 300 of another embodiment. The building article 300 has a fiber cement substrate 302, and subsurface interfacial zones 306a-d formed adjacent to each face of the article 300. Exterior protective layers 304a-d comprising predominantly a radiation curable material is also formed on each face of the article 300. The subsurface interfacial zones 306a-d are preferably integrally formed with the exterior layers 304a-d and the substrate 302.

FIG. 4 shows a cross sectional view of a composite building article 400 of yet another embodiment. The building article 400 has a fiber cement substrate 402 and a number of subsurface interfacial zones 406 distributed throughout the substrate 402. Each subsurface interfacial zone 406 has a circular cross section and extends along the length of the article.

FIG. 5 shows a building article 500 having a fiber cement substrate 502 and a first plurality of discrete subsurface interfacial zones 506 distributed throughout the substrate 502. The building article 500 also has a second plurality of subsurface interfacial zones 508 that are formed within the substrate 502 adjacent to the exterior layers 504. The exterior layers 504 preferably comprise predominantly a radiation curable material. In one embodiment, the radiation curable material incorporated in the first subsurface interfacial zone is different from that in the second interfacial zone.

The building articles schematically illustrated in FIGS. 1-5 represent a variety of different building products such as building boards, sheets, planks, trim, shake, cladding panels suitable for application to the inner and outer surfaces of buildings. One preferred embodiment of the present invention has been developed primarily for use in the manufacture of high performance compressed fiber cement sheets with radiation cured coatings and subsurface interfacial zones specifically configured for use as external or internal building cladding and lining panels.

FIGS. 6-7 illustrate that the concept can also be applied to building articles with annular shaped bodies such as pipes or columns. FIG. 6 is a cross sectional view of a hollow pipe 600 having a fiber cement core 602 and integrally formed subsurface interfacial zones 606a, 606b positioned adjacent to the outer surfaces 604a, 604b of the pipe 600. Preferably, a radiation curable coating is applied to the outer surfaces 604a, 604b of the pipe 600. FIG. 7 illustrates that a second set of subsurface interfacial zones 706 can be distributed in the fiber cement core 602 of the hollow pipe 600 in FIG. 6.

Methods of Forming the Subsurface Interfacial Zones

As will be described in greater detail below, the subsurface interfacial zones in the fiber cement article can be formed by a number of different methods including but not limited to (a) applying in a controlled manner a radiation curable component onto a cured fiber cement matrix; (b) applying in a controlled manner a radiation curable component into an uncured fiber cement matrix; (c) mixing the radiation curable component into a fiber cement mixture prior to the formation of the green form; (d) applying the radiation curable material to a component such as fibers, fillers and/or the inorganic binder of the building article; and (e) pre-preparing a mixture of fiber cement and radiation curable material and then co-forming into a building article with uncured fiber cement material that does not contain a radiation cured component.

In each of the preferred embodiments, the radiation curable component directly contacts the fiber cement matrix and polymerizes while in contact with the fiber cement so as to form a mechanically interlocking network with the pores and interstices of the fiber cement. The application rate and concentration of the radiation curable material is preferably selected to provide the appropriate concentration of polymerizable compounds in the interfacial zone to fill the voids and interstices within the fiber cement matrix to a predetermined degree.

Single Layer Application

In certain preferred embodiments, no additional layers of other coating material is interposed between the radiation curable material and the fiber cement in order to ensure that the polymerized radiation curable material contacts the fiber cement. In one embodiment, a layer of radiation curable material is preferably applied to one or more surfaces of a fiber cement substrate but retains a coherent, substantially defect free film on each surface. This layer of radiation curable material is subsequently migrated into the substrate in a controlled manner to form an integral interfacial zone after curing. As such, a single layer of radiation curable material is sufficient to provide a continuous protective coating that is integrally formed with the fiber cement matrix.

Control of the Thickness of Subsurface Interfacial Zones

In certain preferred embodiments, the thickness of subsurface interfacial zone can also be controlled to tailor to specific product performance criteria. In one embodiment, a pre-selected thickness is achieved by controlling the migration of the radiation curable component into the fiber cement matrix. For example, the porosity of the fiber cement matrix can be modified to a target volume so as to control the rate and quantity of radiation curable component migrating into the fiber cement matrix, thereby controlling the thickness of the interfacial zone. Alternately, the viscosity of the radiation curable component may be modified by formulating it with a predetermined amount of reactive monomer. In some embodiments, the thickness of the interfacial zone is further increased by using a solvent or carrier which is capable of allowing the radiation curable component dissolved therein to be soaked into the fiber cement.

Curing of Radiation Curable Component in Subsurface Interfacial Zone

In order to ensure the curing of the interfacial zone, it is preferably to use a curing method which is capable of curing components deep in the interfacial zone. Curing of the radiation curable component in the subsurface interfacial zone is preferably performed using primarily radiation, more preferably EB radiation. Since the radiation curable component of certain preferred embodiments contains no appreciable amount of catalyst, EB radiation curing is preferred because it has higher energy and can better penetrate the curable components in the interfacial zone, thereby providing a interfacial zone of increased thickness. Moreover, EB curable compounds tend to remain stable in the presence of heat and UV, and thus can be readily activated on demand. The high energy of electrons in such beams enables them to penetrate significant depths and to initiate reactions at greater depth.

Without wishing to be bound to any particular practice, Applicants have found that in fiber cement substrates having a density of about 1.33, for every 30 microns of interfacial zone thickness, adequate cure may be achieved using an EB source between 50 KeV and 200 KeV at 10 mA. For example, a 180 micron thick interfacial zone may be cured using EB source of 150 mA at 10 mA, and thicker interfacial zones may be cured by using correspondingly higher energy EB sources. Alternately, the interfacial zone may be cured with a dosage of EB radiation as described above and subsequently by thermal means. In some embodiments, the cure process may comprise more than one mechanism, such as EB in combination with UV, EB in combination with thermal means, or the like.

FIG. 8 illustrates a process 800 for manufacturing a composite building article of a preferred embodiment of the present invention. In this illustration, the composite building article is a compressed building cladding panel. As shown in FIG. 8, the process 800 begins with step 802 in which an FRC green sheet is manufactured in accordance with known fiber cement compositions and manufacturing techniques. In one embodiment, the fiber cement composition used generally falls within the ranges set out in Table 1 below.

TABLE 1

FORMULATION FOR FRC SHEET

| Dry Ingredients (generic) | Dry Ingredients (a preferred embodiment) | Acceptable range (% by dry weight) | A preferred range (% by dry weight) |
| --- | --- | --- | --- |
| Binder | Cement | about 20-60% | about 23.5-26.5% |
| Aggregate | Silica | about 0 to 60% | about 62-65% |
| Fiber | Cellulose pulp | about 0.1 to 15% | about 7-9% |
| Additives | Alumina | about 0-5% | about 2.5-4.5% |

The binder may comprise ordinary Portland cement type 1 but may also comprise other inorganic binders such as gypsum, geopolymer, or other inorganic cements. The aggregate may comprise milled quartz, amorphous silica, perlite, vermiculite, synthetic calcium silicate hydrate, diatomaceous earth, rice hull ash, fly ash, bottom ash, blast furnace slag, granulated slag, steel slag, mineral oxides, mineral hydroxides, clays, magnasite or dolomite, polymeric beads, metal oxides and hydroxides, or mixtures thereof.

Preferred fibers include various forms of cellulose fibers, such as bleached or unbleached Kraft pulp. However, it will be appreciated that other forms of fibers may be used. In a particularly preferred embodiment, the fiber is cellulose wood pulp. Other examples of suitable fibers are ceramic fiber, glass fiber, mineral wool, steel fiber, and synthetic polymer fibers such as polyamides, polyester, polypropylene, polymethylpentene, polyacrylonitrile, polyacrylamide, viscose, nylon, PVC, PVA, rayon, glass ceramic, carbon, or any mixtures thereof. The fibers may also include cellulose fibers with hydrophobic treatments, biocide treatments, or such as those disclosed in PCT Patent Application WO 0228796 and WO 0228795, which are hereby incorporated by reference in their entirety.

It should also be noted that additional additives can be optionally incorporated into the fiber cement composition including but not limited to density modifiers, dispersing agents, silica fume, geothermal silica, fire retardant, viscosity modifiers, thickeners, pigments, colorants, dispersants, foaming agents, flocculating agents, water-proofing agents, organic density modifiers, aluminum powder, kaolin, alumina trihydrate, mica, metakaolin, calcium carbonate, wollastonite, polymeric resin emulsions, or mixtures thereof.

In one preferred method, the sheets are produced using the Hatschek process. As it is generally known in the art, the Hatschek process uses a series of rotating drum sieves to deposit sequential layers of de-watered slurry onto an absorbent conveyer and accumulate them on a size roll until the desired sheet thickness has been achieved. However, it will be appreciated that the green sheets can also be produced using other known methods such as extrusion, casting, moulding, Mazza, Magnani, Fourdrinier and roll press processes.

The preferred manufacturing process is set to produce a plurality of green sheets of a particular size which are then stacked one upon another and then optionally densified in a press or embossed with a pattern. In Step 804, the green sheets are cured in an autoclave or using any number of other conventional techniques including air curing, moisture curing, or drying.

When curing has been completed, the sheets are optionally cut to size in Step 806 using any variety of cutting, sawing, or scoring techniques.

In Step 808, a radiation curable material is applied at least one face of the FRC sheet. A substantial portion of the radiation curable component extends from the at least one face of the FRC sheet into the fiber cement matrix, fills the voids and interstices therein, and directly contacts the fiber cement. Preferably the radiation curable In some preferred forms of the invention, a radiation curable material, such as a radiation curable sealer, is applied to all six sides of the finished FRC sheet (the front face and mounting face being the two major faces, and the four edges) with a radiation curable sealer. This may be done by first manually roll coating or spraying the sealer on the edges of the stack of FRC sheets and then individually roll coating the sealer on the face and back of an FRC sheet using a conventional roll coater. Alternatively, the sealer may be applied by other conventional methods such as spraying, curtain coating or powder coating. Preferably, the combined thickness of the exterior layer and the subsurface interfacial zone is in the range of about 15 to 1000 microns and more preferably between 15 and 100 microns.

Preferably, the radiation curable material is applied directly to the fiber cement surface and allowed to migrate in a controlled manner into the FRC sheet or substrate to form the interfacial zone in Step 810. In certain embodiments, a continuous, defect free film is applied to the fiber cement in a single pass. In other embodiments, the surface of the FRC sheet is further treated to facilitate controlled migration of the radiation curable material. Mechanical and chemical treatments can also be applied to affect the porosity of the substrate which in turn affects the migration of the radiation curable component into the substrate. The surface of the fiber cement can be sanded, machined, chemically etched prior to application of the radiation curable component, which can have the effect of increasing the thickness and improving the uniformity of the interfacial zone.

In one preferred embodiment, the radiation curable component is a radiation polymerizable compound that is applied to the surface of the FRC as a dispersion in an amount sufficient to ensure that at least a portion of the dispersion penetrates the pores of the FRC substrate to form a subsurface interfacial zone. In an alternative embodiment, the radiation curable component is applied to the FRC green sheet wherein it penetrates into the surface of the FRC green sheet to form a subsurface interfacial zone is in the range of about 15 to 1000 microns thick and more preferably between 15 and 100 microns thick prior to curing the FRC sheet.

In other embodiments, the above blend of uncured FRC and radiation curable component can be distributed or placed in one or more predetermined areas within a bulk matrix of uncured fiber cement which contains no radiation curable material. In yet a further alternative embodiment, a portion of polymerizable compound may be applied in solution, followed by application of the same or different polymerizable or copolymerizable compound to the surface. In yet another alternative embodiment, two or more different blends of radiation curable materials and fiber cement are placed or distributed in one or more predetermined areas within a bulk matrix of uncured FRC which contains no radiation curable material. In another alternative embodiment, the fibers are treated with a radiation curable material and distributed or deliberately placed in one or more predetermined areas within a bulk matrix of uncured fiber cement which contains no radiation curable material.

In Step 812, the FRC sheet is then cured with conventional EB radiation at a suitable predetermined intensity and duration, as determined by the specific sealer formulation. Preferably, EB sources with power of about 50 to 1000 KeV are used, more preferably between about 75 and 500 KeV, and even more preferably between 150 and 300 KeV. The intensity of the EB curing is preferably maintained at constant levels over the surface for the curing period to substantially reduce product imperfections and to achieve a predetermined level of cure, as determined by any number of suitable tests known in the art (e.g. solvent rubs, coating hardness, water or monomer content, etc.). Preferably the cured radiation curable component has less than about 1% by weight reactive monomers or reactive volatile components remaining after curing. More preferably, the cured radiation curable component has less than about 0.1% by weight reactive monomers or reactive volatile components remaining after curing.

Figure 9:
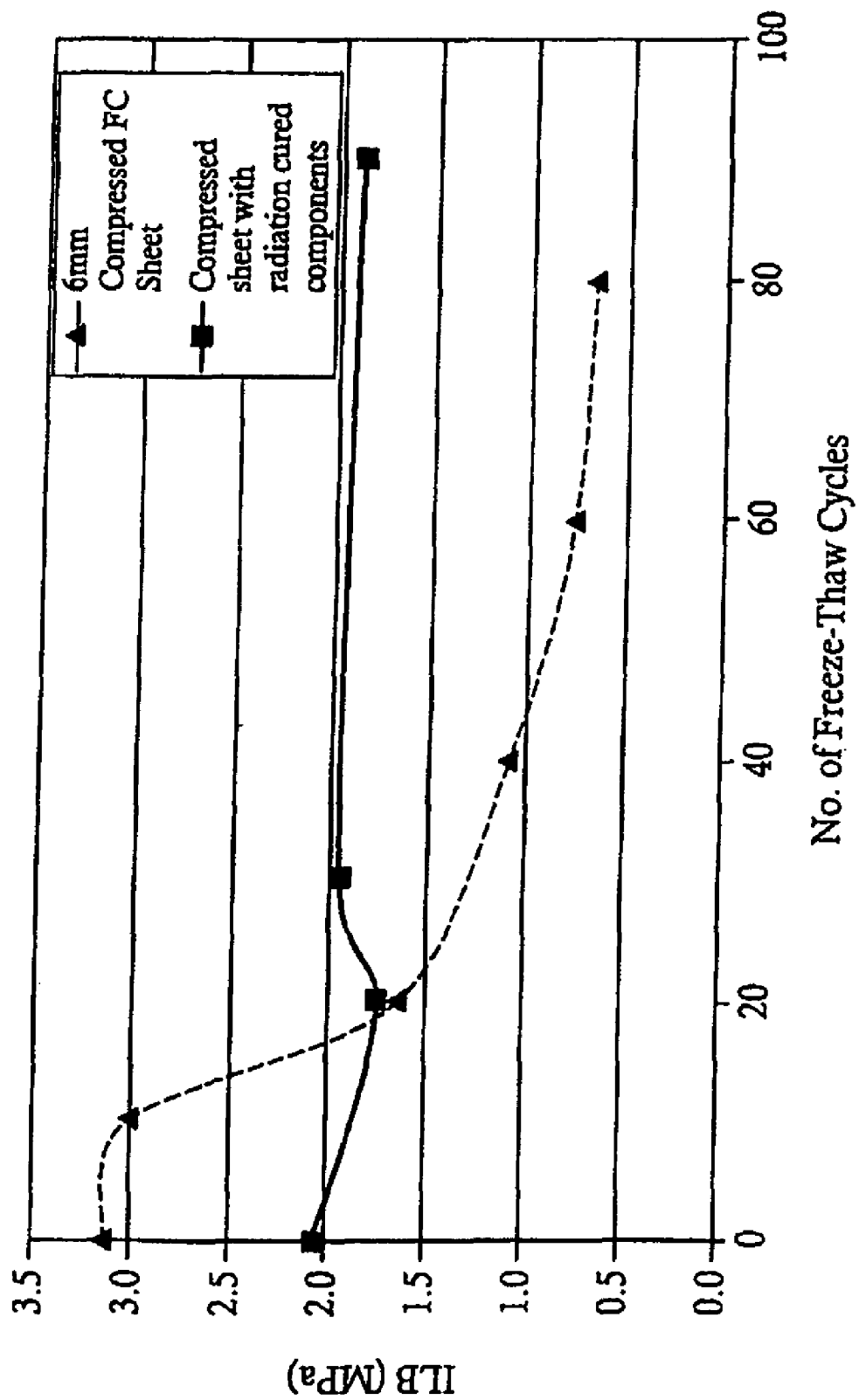
FIG. 9 is a chart comparing the ILB results after freeze-thaw cycling of a compressed FRC of one preferred embodiment with the results of an equivalent compressed FRC sheet without any interfacial zones.

FIG. 9 illustrates the improved freeze thaw resistance of a compressed FRC panel formed with interfacial zones adjacent to all six faces as compared to an equivalent compressed FRC panel without any interfacial zones. As FIG. 9 shows, the FRC panel formed with interfacial zones is able to maintain a relatively constant ILB at about 2.0 Mpa as the number of freeze-thaw cycles increases while the ILB of the conventional compressed FRC panel decreases substantially at higher freeze-thaw cycles. The freeze-thaw cycles were run in accordance with methods described in ASTM C666-92, modified to accommodate a sample size of 415×57×9 mm.

Figure 10A:
FIGS. 10A and 10B are photographs showing an FRC article of one preferred embodiment after cutting and freeze-thaw cycling.
Figure 10B:
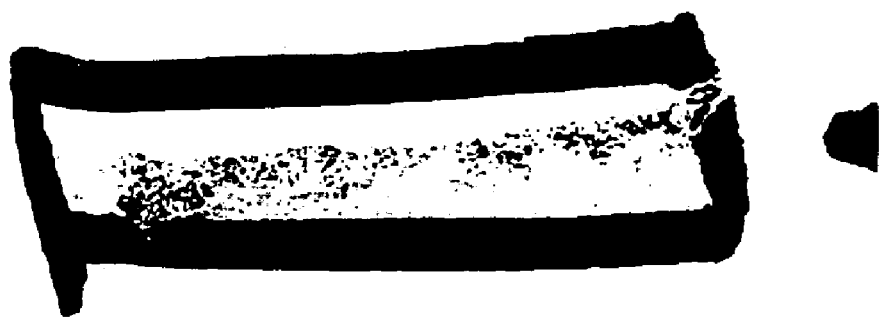

FIGS. 10A and 10B are photographs illustrating the delamination resistance of a FRC composite building article having subsurface interfacial zones. The article was scored deeply, that is to a depth greater than the interfacial zone, subjected to 1,000 freeze thaw cycles. As shown in FIGS. 10A and 10B, the extent of the delamination was limited to a relatively small area even after extensive freeze thaw cycling. This illustrates that not only are the radiation cured zones tightly bound to the fiber cement zone resisting delamination, they also improve the integrity of the FRC article under severe freeze thaw conditions.

The preferred embodiments of the present invention will be further described with reference to the following illustrative Examples.

Example 1

Medium Density Hatschek Sheet for External Application

A ⁷⁄₁₆" medium density fiber cement sheet was formed by the Hatschek process. The plank was of a type normally used for external applications. It was spray coated on all sides with an EB curable urethane acrylate resin having a solids content of about 80%, The resin was cured by exposure to EB radiation. Resin thickness was about 50 microns. The resin zone adhered strongly to the sheet and had a substantially even appearance. Inspection of a cross section of the material showed the presence of three distinct zones—the underlying fiber cement zone, the resin coating and the subsurface interfacial zone, which showed significant quantities of fibrous materials embedded in the resin; and the cured resin forming network of cured polymer the continuously interpenetrates the voids of the subsurface interfacial zone. The subsurface interfacial zone was integral with both the resin and fiber cement regions.

Example 2

Low Density Extruded Article for External Application

A fiber cement article of nominal 2"×4" rectangular cross section of a low density fiber cement of a formulation suitable for external application was extruded. The material was spray coated in the green state with a radiation curable resin and then cured on each surface using EB radiation A similar result was noted as above. There was formation of a good subsurface interfacial zone, not withstanding the use of a very high solids formulation. The green article was then air cured to yield an article with enhanced durability versus articles without such coatings.

Example 3

Fiber Cement Articles Comprising Cellulose Fibers Having an EB Curable Resin Coating Sheets of unbleached kraft fiber were refined to a freeness of about 350 CSF and added to water such that a solution of about 11% fibers by weight is prepared. An aqueous dispersion of EB curable acrylic urethane was added to the fibers at a dosage rate of about 0.5% resin per weight of fiber. The fibers were then combined in solution with cement and ground silica to form fiber cement sheets of about 1 mm thickness. Radiation curable components in the sheets were cured using EB radiation while the fiber cement component of the sheet was maintained in a green state. These fiber cement sheets were then laminated to the top and bottom of a stack of green fiber cement sheets that did not contain radiation curable components to form a composite. The composite stack is cured in an autoclave at about 180 C to further cure the fiber cement sheets. The resulting sheets were less permeable to water through their outer surfaces than fiber cement sheets that did not have fibers treated with radiation curable resin.

Example 4

Medium Density Fiber Cement Article with Epoxy Based Radiation Curable Component An epoxy based radiation curable component (RCC) comprising about 60% w/w difunctional bisphenol A based epoxy acrylate resin, about 15% tripropylene glycol diacrylate monomer, about 20% w/w extender (combination of talc and calcium carbonate) and about 5% w/w additives was rolled onto a medium density fiber cement board to form a continuous film on the surface and a subsurface interfacial zone approximately 5 to 15 microns thick. The total RCC application level was about 39 g/m². The average wet film thickness was determined to be 30 μm using a comb gauge. The RCC was cured using an Electron Beam Curing unit (150 kV, 10 mA laboratory unit from Advanced Electron Beam). The unit was set to 150 kV, 10 mA and 50 ft/min. The unit was purged with nitrogen to achieve an oxygen concentration of about 200 ppm in the chamber. The adhesion of the continuous surface film was tested using a cross-hatched tape test. Adhesion to the board scored 10 points out of a possible score of 10 points.

Example 5

Medium Density Fiber Cement Article with Urethane-Based Radiation Curable Component A urethane RCC consisting of 80% w/w aliphatic difunctional urethane acrylate resin and 20% tripropylene glycol diacrylate monomer was rolled onto a medium density fiber cement board to form a continuous film on the surface and a subsurface interfacial zone approximately 5 to 30 microns thick. The total RCC application level was about 78 g/m$^2$. The RCC was cured using an Electron Beam Curing unit (150 kV, 10 mA laboratory unit from Advanced Electron Beams). The unit was set to 150 kV, 10 mA and 50 ft/min. The unit was purged with nitrogen to achieve an oxygen concentration of 200 ppm in the chamber. The adhesion of the continuous surface film was tested using the cross-hatch tape test. Adhesion to the board was perfect (Rating: 10/10).

Example 6

Medium Density Fiber Cement Article with Polyester-Based Radiation Curable Component A polyester RCC consisting of 60% w/w difunctional polyester acrylate resin 15% tripropylene glycol diacrylate monomer, 20% w/w pigment and extenders (combination of titanium dioxide talc and barium sulphate) and 5% w/w additives (flow additive, dispersant, thixotrope and defoamer) was rolled onto medium density fiber cement board to form a continuous film on the surface and a subsurface interfacial zone approximately 5 to 30 microns thick. The total RCC application level was about 78 g/m$^2$. The average wet film thickness was determined to be 60 μm using a comb gauge. The RCC was cured using an Electron Beam Curing unit (150 kV, 10 mA laboratory unit from Advanced Electron Beams). The unit was set to 150 kV, 10 mA and 50 ft/min. The unit was purged with nitrogen to achieve an oxygen concentration of 200 ppm in the chamber. The adhesion of the continuous surface film was tested using the cross-hatch tape test. Adhesion to the board was perfect (Rating: 10/10).

Example 7

Medium Density Fiber Cement Article with Polyester-Based Radiation Curable Component A polyester RCC consisting of 45% w/w difunctional polyester acrylate, 15% w/w metal acrylate, 15% 1,6 hexanediol diacrylate, 20% w/w pigment and extenders (combination of titanium dioxide talc and barium sulphate) and 5% w/w additives (flow additive, dispersant, thixotrope and defoamer) was rolled onto medium density fiber cement board to form a continuous film on the surface and a subsurface interfacial zone approximately 5 to 20 microns thick. The total RCC application level was about 52 g/m$^2$. The average wet film thickness was determined to be 40 μm using a comb gauge. The RCC was cured using an Electron Beam Curing unit (150 kV, 10 mA laboratory unit from Advanced Electron Beams). The unit was set to 150 kV, 10 mA and 50 ft/min. The unit was purged with nitrogen to achieve an oxygen concentration of 200 ppm in the chamber. The adhesion of the continuous surface film was tested using the cross-hatch tape test. Adhesion to the board was perfect (Rating: 10/10).

Example 8

Medium Density Fiber Cement Article with Thiolene-Based Radiation Curable Component An RCC consisting of 30% w/w hexa-functional aliphatic urethane acrylate, 20% w/w tri-functional polyester acrylate and 50% w/w of pentaerythritol tetrakis (3-mercaptopropinoate) was applied onto medium density fiber cement board using a printing screen to form a continuous film on the surface and a subsurface interfacial zone approximately 5 to 30 microns thick. The RCC was cured using an Electron Beam Curing unit (150 kV, 10 mA laboratory unit from Advanced Electron Beams. The unit was set to 150 kV, 10 mA and 50 ft/min, under air. The continuous surface film was tack free; adhesion was tested (dry and then after one hour soaking in water) using the cross-hatch tape test. Adhesion to the board was perfect in both cases (Rating: 10/10).

Example 9

Medium Density Fiber Cement Article with a Pigmented Thiolene-Based Radiation Curable Component An RCC topcoat consisting of 20% w/w hexa-functional aliphatic urethane acrylate, 14% w/w tri-functional polyester acrylate, 35% w/w of pentaerythritol tetrakis (3-mercaptopropinoate), 30% w/w pigment and extenders (combination of titanium dioxide talc and barium sulphate) and 1% w/w additives (flow additive, dispersant, thixotrope and defoamer) was rolled onto medium density fiber cement board to form a continuous film on the surface and a subsurface interfacial zone approximately 5 to 20 microns thick. The total RCC application level was about 52 g/m$^2$. The average wet film thickness was determined to be 40 um using a comb gauge. The RCC was cured was cured using an Electron Beam Curing unit (150 kV, 10 mA laboratory unit from Advanced Electron Beams). The unit was set to 150 kV, 10 mA and 50 ft/min, under atmospheric condition. The continuous surface film was tack free; adhesion was tested (dry and then after one hour soaking in water) using the cross-hatch tape test. Adhesion to the board was perfect in both cases (Rating: 10/10).

Example 10

Medium Density Fiber Cement Article Having an RCC Treated Interfacial Zone Having Improved Wet Adhesion A urethane RCC consisting of 80% w/w aliphatic difunctional urethane acrylate and 20% tripropylene glycol diacrylate. The RCC was rolled onto the face of medium density fiber cement board to form a continuous film on the surface and a subsurface interfacial zone approximately 5 to 30 microns thick. The total RCC application level was about 78 g/m$^2$. The average wet film thickness was determined to be 60 um using a comb gauge. The RCC was cured using an Electron Beam Curing unit (150 kV, 10 mA laboratory unit from Advanced Electron Beams). The unit was set to 150 kV, 10 mA and 50 ft/min. The unit was purged with nitrogen to achieve an oxygen concentration of 200 ppm in the chamber. The wet adhesion of the continuous surface film was then tested. This was conducted by completely immersing the test panel in water at room temperature for 2 hours. The panel was then removed patted dry with a cloth to ensure there was no residual moisture to interfere with adhesion of the tape. The adhesion of the coating was then immediately checked using the cross-hatch tape test. Adhesion to the board was perfect (Rating: 10/10).

Example 11

Medium Density Fiber Cement Article Having an RCC Treated Interfacial Zone Showing Reduced Surface Permeability A urethane RCC consisting of 80% w/w aliphatic difunctional urethane acrylate and 20% tripropylene glycol diacrylate. The coating was rolled onto all 4 edges, face and back of a medium density fiber cement to form a continuous film on each surface and a subsurface interfacial zone approximately 5 to 30 microns thick. The total RCC application level was about 78 g/m². The average wet film thickness was determined to be 60 um using a comb gauge. The RCC was cured using an Electron Beam Curing unit (150 kV, 10 mA laboratory unit from Advanced Electron Beams). The unit was set to 150 kV, 10 mA and 50 ft/min. The unit was purged with nitrogen to achieve an oxygen concentration of 200 ppm in the chamber. The water permeability of the coating was tested using a water column placed under a pressure of 2 bar for 7 minutes. The test panel was weighed before and after exposure to the pressurized water column. Upon removal from the test column the sample was dried and reweighed. The panel did not exhibit a weight change after exposure to the pressurized water column.

The forgoing examples of an FRC building article having a subsurface interfacial zone comprising radiation curable components demonstrate the substantial improvement the present invention makes toward the long term durability of FRC materials in extreme environments such as freeze thaw and generally improves wet and dry adhesion of surface films. Radiation curable components may be added to the fiber cement, either to the entire batch of fiber cement forming material, or in the form of an added zone of material which includes both fiber cement and curable material and which is applied to a fiber cement or fiber cement forming substrate. In this way, the subsurface interfacial zone with an intimate mixing of curable compound and fiber cement is pre-prepared. For example, a zone of fiber cement can be laid down and a zone which is a mixture of fiber cement and curable compound is applied thereon. The fiber cement product is then allowed to cure, producing a fiber cement article having polymerisable compound in the top zone intimately mixed with the fiber cement material. A further zone of curable compound can be added on top of this, and the mixture is then cured for example with an electron beam. The EB curable material in the uppermost zone will crosslink with other crosslinkable components in the upper zone and also with the crosslinkable components in the pre-prepared subsurface interfacial zone. In this way, the subsurface interfacial zone is formed specifically by the application of a mixture of components of the resin and fiber cement zones. The advantage with using EB curable compounds is that they can remain stable in the presence of heat and UV, and thus can more readily be activated on demand.

Advantageously, the composite building products of the preferred embodiments of the present invention, as compared with similar sheets prepared using traditional surface coatings, present a higher resistance to external atmospheric agents, heat, moisture and, in particular, to scratching or abrasion; they can be used in the field of building as covering of outer surfaces of buildings. They can also be used in applications where chemical resistance is an issue, such as in pipes. The addition of a cured subsurface interfacial zone imparts to the composite article a reduced propensity to weathering, especially freeze/thaw damage or differential carbonation, when compared to existing fiber cement products.

Although the foregoing description of the preferred embodiments of the present invention has shown, described and pointed out the fundamental novel features of the invention, it will be understood that various omissions, substitutions, and changes in the form of the detail of the invention as illustrated as well as the uses thereof, may be made by those skilled in the art, without departing from the spirit of the invention. Particularly, it will be appreciated that the preferred embodiments of the invention may manifest itself in other shapes and configurations as appropriate for the end use of the article made thereby.

What is claimed is:

1. A composite building article having a first zone comprises a fiber cement substrate having a porosity of between about 20%-40% by volume which comprises predominantly fiber cement comprising
    about 20-60 weight % cement;
    about 0 to 60 weight % silica;
    about 0.1 to 15 weight % cellulose fiber; and
    about 0-5 weight % of at least one additive;
    a second zone which comprises predominantly an EB curable urethane acrylate resin having a solids content of at least 80%, and a subsurface interfacial zone interposed therebetween, the subsurface interfacial zone comprising an interlocking matrix formed of the EB curable urethane acrylate resin and the fiber cement, wherein said interfacial zone is integrally formed with the first and second zones and configured to increase durability of the building article.

2. The composite building article of claim 1, wherein the subsurface interfacial zone contains substantially no catalyst.

3. The composite building article of claim 1, wherein the thickness of the subsurface interfacial zone is controlled by modifying a characteristic selected from the group consisting of the porosity of the first zone, viscosity of the radiation curable component, and combinations thereof.

4. The composite building article of claim 1, wherein the subsurface interfacial zone has a thickness of about 1 μm-1,000 μm.

5. The composite building article of claim 1, wherein the composite building article is selected from the group consisting of cladding panels, sheets, boards, planks, trims, shakes, and pipes.

6. The composite building article of claim 1, wherein the cement is in the range of about 23.5 to 26.5% of the composition.

7. The composite building article of claim 1, wherein cellulose fibers comprises about 7-9% of the composition.

8. The composite building article of claim 1, wherein the cellulose fibers are unbleached.

9. The composite building article of claim 8, wherein the unbleached cellulose fibers comprise about 11% by weight of the composition.

10. The composite building article of claim 1, wherein the EB curable urethane acrylate resin consists essentially of about 45% difunctional polyester acrylate, about 15% metal acrylate, and about 15% 1,6 hexanediol diacrylate.

11. The composite building article of claim 10, wherein the subsurface interfacial zone is approximately 5 μm to 20 μm.

12. The composite building article of claim 1, wherein the EB curable urethane acrylate resin consists essentially of about 20% hexafunctional aliphatic urethane acrylate, 14% trifunctional polyester acrylate, and about 14% 3-mercaptopropinoate.

13. The composite building article of claim 12, wherein the subsurface interfacial zone is approximately 5 μm to 20 μm.

14. A composite building article having a first zone consisting essentially of:
- a fiber cement composition consisting essentially of:
  - 20-60 weight % cement;
  - 0 to 60 weight % silica;
  - 0.1 to 15 weight % unbleached cellulose fiber; and
  - 0-5 weight % of at least one additive;
- a second zone which comprises predominantly an EB curable urethane acrylate resin; and
  - a subsurface interfacial zone interposed and integrally formed with the first and second zones and comprising an interlocking matrix formed of the EB curable urethane acrylate resin and the fiber cement, the first zone having a porosity of between about 20%-40% by volume and the EB curable urethane acrylate resin in the subsurface interfacial zone contains substantially no catalyst and is curable primarily by radiation.

15. The composite building article of claim 14, wherein cellulose fibers comprises about 7-9% of the composition.

16. The composite building article of claim 14, wherein the unbleached cellulose fibers comprise about 11% by weight of the composition.

17. The composite building article of claim 14, wherein the at least one additive is selected from the group consisting of flow additive, dispersant, thixotrope, defoamer, and a combination thereof.

* * * * *